United States Patent [19]

Iseli

[11] Patent Number: 5,283,987
[45] Date of Patent: Feb. 8, 1994

[54] SAW BLADE CLAMP UNIT
[75] Inventor: Benno Iseli, Schotz, Switzerland
[73] Assignee: Iseli & Co., A.G., Schotz, Switzerland
[21] Appl. No.: 880,180
[22] Filed: May 7, 1992
[30] Foreign Application Priority Data May 7, 1991 [GB] United Kingdom ......... 9109801

[51] Int. Cl.⁵ .................. B24B 19/00; B23D 63/00
[52] U.S. Cl. .................. 51/221 BS; 51/217 R; 76/78.1; 269/30; 269/25
[58] Field of Search .......... 51/221 BS, 216 R, 217 R, 51/219 PC, 220; 76/78.1; 269/30, 25, 254 CS, 269

[56] References Cited

U.S. PATENT DOCUMENTS

| | | | |
|---|---|---|---|
| 3,487,592 | 1/1970 | Kotthaus | 51/220 |
| 3,962,832 | 6/1976 | Strasbaugh | 269/25 |
| 4,355,551 | 10/1982 | Kolleas | 76/78.1 |
| 4,483,218 | 11/1984 | Beck | 76/78.1 |
| 4,544,310 | 10/1985 | Tyynela | 51/219 PC |
| 4,858,392 | 8/1989 | Beck | 51/218 T |
| 5,101,690 | 4/1992 | Emter | 76/78.1 |

*Primary Examiner*—Bruce M. Kisliuk
*Assistant Examiner*—Bo Bounkong
*Attorney, Agent, or Firm*—Locke Reynolds

[57] ABSTRACT

A saw blade clamp unit for holding saw blade in a manner to permit machining of side faces of hard material tips provided upon the teeth of the saw blades. The saw blade clamp unit clamps a saw blade tooth adjacent to a saw blade tooth tip being machined, holding the saw blade. The clamping mechanism of the clamp unit is arranged to form a lateral reference position for the tooth to be machined, with the tooth being set to the required grinding position during the clamping operation.

17 Claims, 2 Drawing Sheets

SAW BLADE CLAMP UNIT

BACKGROUND OF THE INVENTION

This invention relates to apparatus for facilitating the machining or grinding of predetermined regions of workpieces.

In particular, the present invention is concerned with the grinding of the side faces of hard material tips mounted to the teeth of saw blades.

Machines are known for the grinding of the side faces of such tips whether on circular or linear i.e., band saws in which both side faces are ground in a single operation.

Generally, after the side faces of a tip have been ground the tooth tip is broadest at its leading i.e., cutting edge and diminishes in width from the leading edge to the rear face of the tip. In addition, the side face grinding is such that the tip tapers from the top face of the tip towards the bottom of the tip.

As is well known, the purpose of the side face grinding is to produce side faces which are mutually inclined at predetermined angles to the planes of the side faces of the blade body and teeth. In addition, generally speaking the grinding must be such that the side faces are symmetrically ground with respect to the blade body so that corresponding points on the both side faces of a tip are equidistant from the medial plane of the blade body, except where the grinding is intended to produce an asymmetrical arrangement. To achieve this it is important, during the grinding of the tips on the teeth on the blade, that the blade/tooth should not deflect from the required correct grinding position. Firmly clamping the blade against displacement with respect to the grinding wheels is necessary.

Following completion of the machining/grinding of each saw tip blade tooth, successively indexing the saw blade to bring the next tip to be machined to the location of the machine at which the side grinding wheels are able to grind the side faces is required. This position can be termed the grinding station. During this indexing operation the clamping of the blade has to be released so that the blade is free to be moved by an indexing finger or the like which is arranged to advance the next tooth whose tip is to be machined/ground to the grinding station. Indexing involves pushing against the tooth in question while at the same time guiding the blade through the blade clamping means. At the completion of the indexing operation the blade is reclamped to prevent movement of the blade.

In known machines the usual practice involves clamping the body blade well below the gullets of the teeth so that the clamping arrangements when released do not impede the indexing operation, and so that they do not impede operational movements of the grinding wheels themselves. This mode of clamping relies upon the strength of the blade body, assuming that grinding wheel pressures upon a tip will not distort the tooth with respect to the blade body. However, in practice distortion can occur, leading to an incorrectly machined tip.

A further difficulty arises in relation to the known clamping arrangements because with known machines it is necessary to remove the clamping arrangements from one side of the blade to enable a blade to be removed. In this connection it is convenient to bear in mind that some blades, especially band saw blades, can be twenty or more centimetres deep so that blade changing is a relatively complex and time consuming operation, particularly if it is not possible conveniently to remove the blade clamping arrangements.

As indicated above, an important requirement for the machining of saw blade tips is that their side faces should be machined or ground so that the resulting ground side faces are symmetrically positioned with respect to the medial plane of the saw blade body. In other words, it is usually required that each tip should project to the same extent to either side of this medial plane.

Hitherto it has been presumed that with the known machines and their associated blade clamping arrangements that this conditon of symmetry (when required) is always achieved even though before the grinding operation the tips may have projected unequally to opposite sides of a tooth tip. In other words, it has been assumed without respect to initial individual widths of the tips in relation to the saw blade body, after grinding the required dimensions and angles for the side faces had been achieved.

Industrial users of, for example, band saw blades, have been demanding thinner and thinner saw blades and associated tips so that the amounts of wood wasted during sawing operations such as reducing a tree trunk to planks is reduced. In addition, since one of the most effective materials for the production of saw blade tips, namely the material known under the trade name Stellite, is comparatively expensive, further consequence of thinner blades is that the tips will also be small/thinner in size, reducing the amount of Stellite required for each tip.

It has been found that the presently available clamping arrangements are not adequate for holding a saw blade during the side face grinding of tips on the teeth of saw blades which are thinner than those conventionally contemplated. Whenever a tip on such thin saw blades is not initially symmetrically positioned with respect to the medial plane of the blade body, the pressures exerted by the grinding wheels during grinding distorts the tooth with respect to the clamped blade body medial plane. Consequently where such distortion has occurred the tip remains effectively offset with respect to the medial plane of the blade body and the face angles may well be incorrectly formed since the grinding operation has not removed the excess thickness to one side of the blade. The use of such saw blades whose side faces are not ground to the correct angles and size are very inefficient in operation and become rapidly damaged.

OBJECT OF THE INVENTION

It is therefore an object of the present invention to reduce the changes of incorrect machining of tips on the teeth of saw blades.

SUMMARY OF THE INVENTION

Broadly, according to a first aspect of the invention there is provided a saw blade clamp unit for tools or apparatus for the machining of the side faces of hard material tips provided upon the teeth of saw blades, including clamp means for clamping the actual tooth whose tip is adjacent, or next to the tip to be machined, against displacement with respect to the machining tool(s) of the apparatus.

Preferably, the means for clamping the adjacent tooth whose tip is the next tip to be machined includes means for setting a reference position for the tooth to be machined whereby the tooth is automatically set during a clamping operation to the required grinding position.

Preferably, the clamp means also includes means for clamping the blade whose teeth tips are to be machined against displacement during the machining of a tip at a location in the immediate vicinity of the tooth whose tip is next to be ground.

Conveniently, pivotable means are provided for supporting the clamp means in such manner that the clamp means is pivotable to a location clear of the blade and its teeth, the arrangement being such as to facilitate the mounting and removal of a blade with respect of said machine.

In accordance with a further aspect of the invention a saw blade clamp unit for apparatus for the machining of the side faces of hard material tips provided upon the teeth of saw blades, includes first means for clamping the actual tooth whose tip is the next tip to be machined, against displacement with respect to the machining tool(s) of the apparatus and a second means for clamping the blade at a location in the vicinity of the teeth of the blade.

Preferably, the clamping means are also mounted from the remainder of the apparatus so that at least a part of the clamping means can be moved between its blade clamping position and a second position in which the clamping means at least to one side of the blade are clear of the blade and its tipped teeth thereby to facilitate the mounting of the blade to the apparatus for the purposes of the machining of the tips and the subsequent removal of the blade from the machine after the machining of the tips thereof.

The various features and advantages of the invention will become more apparent to those skilled in the art upon consideration of the following detailed description of a preferred embodiment exemplifying the best mode of carrying out the invention as presently perceived. The detailed description particularly refers to the accompanying drawings.

BRIEF DESCRIPTION OF THE DRAWINGS

For a better understanding of the invention and to show how to carry the same into effect reference will now be made to the accompanying drawings in which.

DESCRIPTION OF THE PREFERRED EMBODIMENTS

Figure 1:
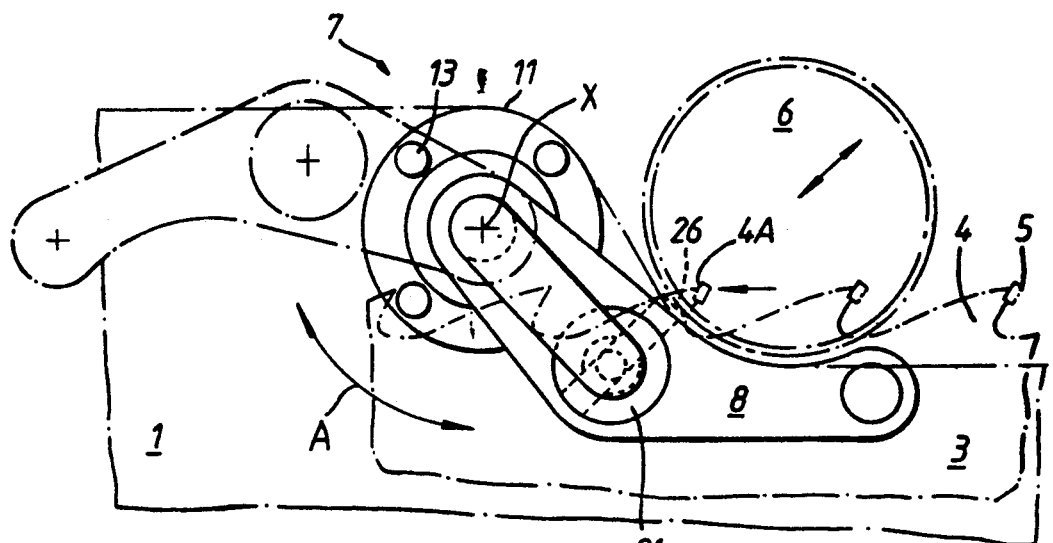
FIG. 1 is front view of a first embodiment of apparatus incorporating the features of the invention.
Figure 2:
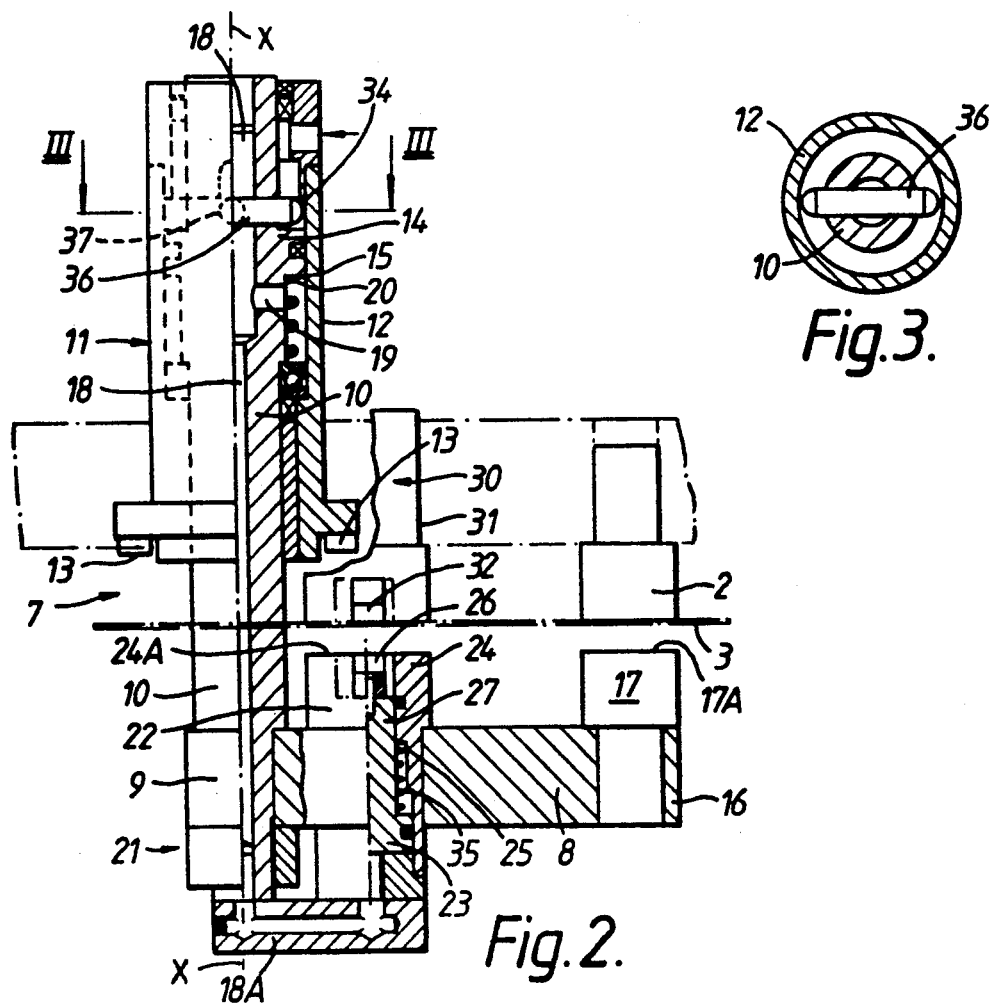
FIG. 2 is a plan partially in section view of the apparatus of FIG. 1.
Figure 3:
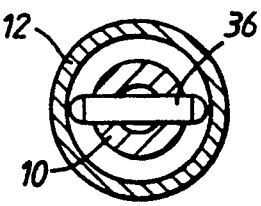
FIG. 3 is a sectional view along the line III—III of FIG. 2.

Referring now to the drawings and in particular to FIGS. 1, 2 and 3, in which a fragmentary portion of a main frame of a grinding apparatus/machine is shown at 1. A positionally adjustable guide means 2 is provided on the machine frame 1 generally to position a blade 3 for movement along a predetermined path through the machine at the location shown in the Figures and thus relative to the frame 1. As will be discussed hereinafter the guide means 2 has a further function over and above that of a simple blade guide means.

The blade 3 has teeth 4 with tips 5 each comprising a hard material such as the material known under the Trade Name Stellite.

In the figures only a fragmentary portion of a blade 3 whose tips 5 are to be ground is shown.

The apparatus/machine incorporates a plurality of suitably positioned support rolls (not shown) for the blade and upon which the blade rests. An indexing mechanism including an indexing finger (not shown) which engages with a tooth during indexing is provided for indexing the blade 3 so that the next tooth tip to be ground i.e., that on the tooth 4A is located at a so-called grinding position at which grinding wheels 6, of which one is schematially shown, can be caused to grind the side faces of the tips 5.

As has been mentioned the blade 3 is required to be firmly clamped against movement relative to the remainder of the machine and thus the grinding wheels 6 during the side face grinding operation by a hydraulically/pneumatically operable blade clamping assembly generally indicated at 7.

In general, the clamping assembly 7 includes an arm 8 connected at one end 9 to the ram rod 10 of a hydraulic ram/cylinder unit 11 whose cylinder 12 is connected by means of bolts 13 to the main frame 1.

The ram unit 11 is so positioned that the ram rod 10 is axially transverse to the direction of advance of the blade along its predetermined path through the machine and bridges the saw blade 3 to allow the arm 8 to be positionable adjacent to the toothed region of the outer side of the blade blade as may be seen from FIG. 2. The inner side of the blade is regarded as that surface thereof that faces towards the machine frame 1.

As will be discussed later the ram unit 11 incorporates arrangements whereby the ram rod 10 can be rotated within the cylinder 12 thereby to make it possible to rotate the lever arm 8 between an operational position in which it is in the full line position shown in FIGS. 1 and 2 i.e., adjacent to the outer face of the blade 3 and a non-operational or retracted position which is shown in FIG. 1 in phantom. In this latter position it will be noted that the arm 8 has been moved to a position in which it is effectively totally above the teeth and tips the blade. In operation the arm 8 is moved to this retracted position to allow a saw blade 3 to be mounted to the side face grinding machine and to be removed therefrom after grinding has been completed, and returned to the position shown in the Figures in full lines after the blade has been mounted.

The arrangements provided for enabling such rotation will be briefly discussed hereinafter.

The ram rod 10 is associated with a piston 14 which is so resiliently loaded by a spring 15 that the rod 10 is drawn inwardly of the cylinder 12 and in so doing moves the arm 8 towards the blade 3.

The arm 8 carries at its free end 16 a clamping member 17 which is intended pressurewise to cooperate with the guide member 2 which latter thus additionally serves as the anvil part of a blade clamping means.

The guide member 2 and the clamping member 17 are located below the level of the tips on the blade and serve to cooperate with the blade in the immediate vicinity of the root regions of the teeth 4.

The resilient loading of the rod 10 is such that the member 17 presses lightly against the blade 3 and essentially serves to guide the blade body when subjected solely to the spring force.

A duct 18 for pressurized hydraulic/pneumatic fluid extends lengthwise of the ram rod 10 and has a first fluid connection 19 with the underside 20 of the piston 14 (as shown in the drawings) whereby the application of fluid pressure to the underside 20 of the piston 14 pulls the ram rod 10 inwardly and thus causes the member 17 to cramp the blade 3 between the member 2 and the member 17 thereby to prevent displacement of the blade 3 relative to the machine frame 1.

The arm 8 is provided with a second blade clamping arrangement 21 which is so positioned as to be able to clamp against the actual tooth 4A whose tip is the next tip to be machined against displacements arising from the action of the grinding wheels 6.

This second blade clamping arrangement 21 includes a second hydraulic/pneumatic ram unit 22 having a piston 23 slidable within a cylinder 24. This second piston 23 is resiliently loaded by spring 25 away from the blade 3.

This is necessary so as to allow the blade to be indexed.

The end face 24A of the cylinder 24 lies in the same plane as the end face 17A of the clamping member 17 and forms a clamping face co-planar with that of the member 17.

In other words the rest position of the second clamping means 21 is spaced away from the blade 3 at a position allowing for sufficient clearance for free movement of the blade.

A second blade clamping member 26 is connected to the free end of the ram rod 27 connecting with the piston 23 movable within the cylinder 24. This second clamping member 26 is of an elongate shape and is so aligned with respect to the arm 8 that it effectively lies lengthwise of the tooth 4A whose tip is the next tip to be ground/machined. The clamping member 26 extends substantially up to the base of the tip 5 so that the complete length of the tooth 4A is clamped thereby preventing any undesired movements of the tooth 4A during a machining operation.

A further clamping arrangement 30 complementary to the member 25 is mounted from the main frame 1. This second arrangement is conveniently formed by a further ram unit 31 of construction generally similar to that of ram unit 22 carried by the arm 8, but in this case ram unit 31 is mounted from the main frame 1.

That is to say the further clamping arrangement incorporates a further clamping member 32 of form and orientation similar to the clamping member 26. In view of the similarity of the two clamping arrangements further consideration of the arrangement 30 and its clamping member 32 is not thought necessary.

The clamping arrangements 21 and 30 thus provide a means whereby the tooth 4A can be very firmly clamped against movement during the machining operation.

In order to provide for an accurately repeatable reference position for the clamping surfaces of the above discussed clamping arangements the travel of the piston 14 within the cylinder 12 is limited by a stop surface 34 in such manner that by the time the piston has contacted the stop surface 34 the two clamping members 17 and 26 have pressed against the blade and have clamped the blade in the position in which the medial plane thereof is correctly positioned with respect to the machine frame 1.

The fluid duct 18 passing through the ram rod 10 fluidwise connects with the rear (lower end) of the piston 23 by way of a connection duct forming link 18A so that when the ram unit 10 is pressurized to advance the arm 8 and the member 25/17 towards the blade 3 and after the piston 14 has abutted the associated stop surface 34 the second clamping arrangement is subjected to pressure sufficient to press clamping member 26 against the tooth. As before the piston 23 will cooperate with an associated stop surface 35 so as accurately to define the reference position for the tooth itself.

At the same time the clamping means 31 will be subjected to pressure such as to hold the tooth firmly against the reference surface formed by the displacement of the ram rod 10, the arm 8, and its associated clamping arrangements.

With this arrangement the tooth is firmly restrained against any movements that could result from grinding wheel pressures.

After the side grinding of the tip faces of the tooth 4A has been completed the clamping effect of the clamping arrangements are released by removal of the pressurized fluid, which allows the resilient loading on the various pistons to take effect thereby to retract the clamping members from their respective clamping positions.

At this stage the blade 3 can be indexed as above discussed.

As has been mentioned to facilitate the mounting and removal of a saw blade 3 the ram rod 10 and the associated arm 8 are rotatable about the axis X through arc A relative to the main ram unit cylinder 12 from the position shown in solid lines in FIGS. 1 and 2 to the position shown in dashed lines in FIG. 1.

The ram rod 10 is held in the position shown in FIG. 1 by a release pin 36 engaging in a bore 37 in the ram rod 10, the position of the release pin being controlled by the action of pressurized fluid on the pin.

To release the ram rod 10 for pivoting, the release pressurized fluid is used to displace the pin release 36 to withdraw it from locking the piston against rotation within the cylinder and thereby to allow the relative rotation of the ram rod 10 within its cylinder 12.

The structure of the release pin 37 is such that returning the crank-like lever 8 to the position shown in FIG. 1, the release pin automatically moves to the ram rod locking position against rotation.

Figure 4:
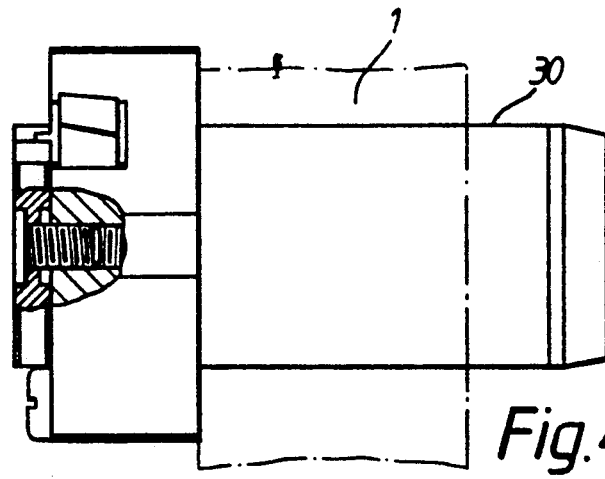
FIG. 4 is a side view partially in section of a clamping member for use in an apparatus incorporating the features of the invention.
Figure 5:
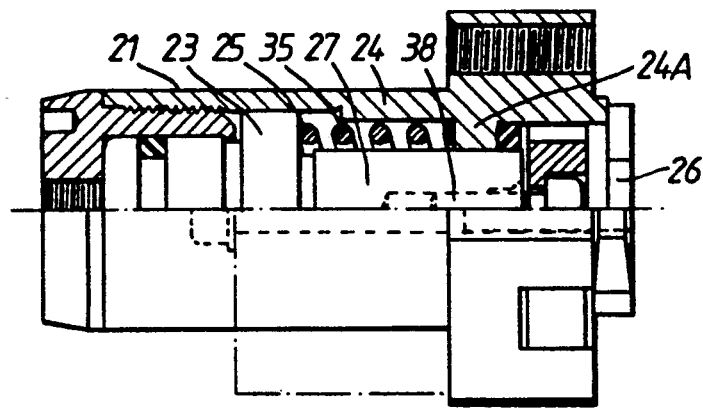
FIG. 5 is side view partially in section of another clamping member.
Figure 6:
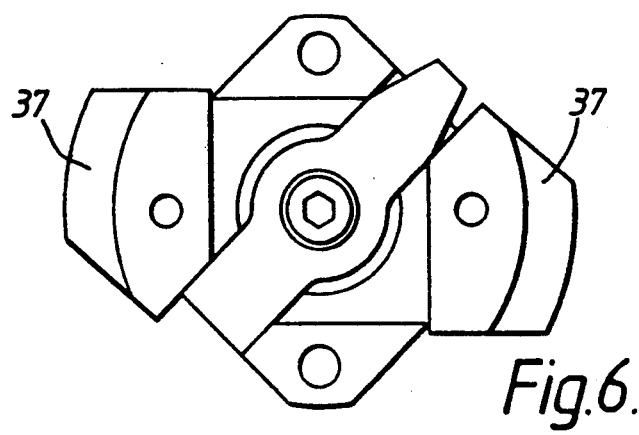
FIG. 6 is an end view of the clamping member shown in FIG. 5.

FIGS. 4 to 6 are concerned with a particular construction of the clamping members 30 and 21. For convenience those components which have already been mentioned in connection with FIGS. 1 to 3 will be identified with the same reference numerals.

The clamping arrangement of the FIGS. 4 and 5 effectively corresponds to the clamping arrangement 21 and includes a ram unit 21 with a piston 23 movable within a cylinder 24, the piston 23 being connected with a ram rod 27 which is slidably supported within the cylinder by an inwardly directed guide flange 24A.

The piston 23 at its free end mounts wing like clamping means 37 which is intended to press against the blade in the vicinity of the tooth 4A. The ram rod 27 slidably mounts a secondary piston 38 which in turn mounts the elongate blade clamping means 26 which is intended to engage along the length of a tooth 4A so that the slightly tapered end thereof is located very close to the actual location to which the tip is secured to this tooth.

The piston 23 is resiliently loaded by the spring 25 so that the clamp member 26 is effectively urged towards a retracted position, i.e., that shown in the drawing, Arrangements are provided for ducting pressurized hydraulic/pneumatic fluid into the cylinder 24 in such manner when the pressurized fluid is so introduced the piston 23 is displaced against its resilient loading by the spring 25 into a position in which it is able to cause the piston to cooperate with the stop surface 35. At this position the wing members 35 effectively define the reference position for the blade 3.

As has been mentioned the travel of the piston is limited by the stop surface 35. Once the piston reaches this stop surface 35 the pressurized fluid is able to exert sufficient pressure on the secondary piston 38 to cause it firmly to press the elongate member 26 towards and against the tooth 4A thereby to hold the latter firmly against the clamping arrangements located to the other side of the blade.

The clamp arrangement disclosed in FIG. 4 is effectively similar to the arrangement 30 and in practice has the same function.

I claim:

1. A clamping assembly comprising:
   a first cylinder,
   a ram rod having a first portion movably situated within the first cylinder and a second portion projecting outward from the first cylinder, the first cylinder and ram rod first portion having means for defining a fluid receiving chamber,
   an arm fixed to the second portion,
   a clamping member fixed to the arm including a second cylinder and a piston within the second cylinder,
   a duct connecting the fluid receiving chamber and the second cylinder for allowing fluid pressure to be applied to both, and
   means coupling the ram rod and first cylinder for permitting the arm to be rotated between a first operational position and a second retracted position.

2. A clamping assembly according to claim 1 further comprising spring means resiliently loading the ram rod with respect to the first cylinder.

3. A clamping assembly according to claim 1 further comprising stop means for regulating the movement of the ram rod within the first cylinder.

4. A clamping assembly according to claim 1 further comprising spring means resiliently loading the piston with respect to the second cylinder.

5. A clamping assembly according to claim 1 further comprising an elongated member on an end face of the piston.

6. A clamping assembly according to claim 1 further comprising a main frame, means for coupling the first cylinder to the main frame, and a second clamping member fixed to the main frame to confront the clamping member fixed to the arm.

7. A clamping assembly according to claim 6 further comprising an additional clamping member fixed to the arm and a guide member fixed to the main frame to confront the additional clamping member.

8. A saw blade clamp unit for holding a saw blade comprising:
   a main frame and means for coupling a first cylinder to the main frame,
   a ram rod having a first portion movably situated within the first cylinder and a second portion projecting outward from the first cylinder away from the main frame, the first cylinder and ram rod first portion having means for defining a fluid receiving chamber,
   an arm fixed to the second portion generally parallel to the main frame,
   a clamping member fixed to the arm including a second cylinder and a piston within the second cylinder projecting toward the main frame,
   a duct connecting the fluid receiving chamber and the second cylinder for allowing fluid pressure to be applied to both to cause the piston to be forced toward the main frame, and
   means coupling the ram rod and first cylinder for permitting the arm to be rotated between a first operational position adjacent a saw receiving area of the main frame and a second retracted position remote from the saw receiving area.

9. A saw blade clamp unit according to claim 8 further comprising spring means resiliently loading the ram rod with respect to the first cylinder to draw the arm toward the main frame, and stop means for regulating the axial movement of the ram rod within the first cylinder.

10. A saw blade clamp unit according to claim 8 further comprising spring means resiliently loading the piston with respect to the second cylinder to a position away form the main frame.

11. A saw blade clamp unit according to claim 8 further comprising an elongated member on an end face of the piston sized to engage a tooth of a saw blade.

12. A saw blade clamp unit according to claim 8 further comprising a second clamping member fixed to the main frame to confront the clamping member fixed to the arm, an additional clamping member fixed to the arm and a guide member fixed to the main frame to confront the additional clamping member, the saw blade to be received between the confronting members.

13. A saw blade clamp unit according to claim 12 wherein the second clamping member fixed to the main frame comprises a cylinder and a piston within the cylinder directed outward away from the main frame, spring means resiliently loading the piston with respect to the cylinder to a position toward the main frame, and an elongated member on a face of the piston sized to engage a tooth of a saw blade.

14. A saw blade clamp unit for holding a saw blade in a manner to permit machining of side faces of hard material tips provided upon teeth of the saw blade, the saw blade clamp unit comprising:
   a main frame and means for coupling a first cylinder to the main frame,
   a ram rod having a first portion movably situated within the first cylinder and a second portion projecting outward from the first cylinder away from the main frame, the first cylinder and ram rod first portion having means for defining a fluid receiving chamber,
   an arm fixed to the second portion generally parallel to the main frame,
   a clamping member fixed to the arm including a second cylinder, a piston within the second cylinder projecting toward the main frame, and an elongated member on a face of the piston sized to engage one side of a tooth of a saw blade,
   a duct connecting the fluid receiving chamber and the second cylinder for allowing fluid pressure to be applied to both to cause the piston to be forced toward the main frame, a second clamping member fixed to the main frame to confront the clamping member fixed to the arm, the second clamping member including another cylinder, another piston within the another cylinder projecting away from the main frame, and an elongated member on a face of the another piston sized to engage a second side of a tooth of a saw blade, the saw blade to be received between the confronting members, and means coupling the ram rod and first cylinder for permitting the arm to be rotated between a first operational position adjacent a saw receiving area of the main frame and a second retracted position remote from the saw receiving area to permit insertion and removal of the saw blade.

15. A saw blade clamp unit according to claim 14 further comprising spring means resiliently loading the ram rod with respect to the first cylinder to draw the arm toward the main frame, and stop means for regulating the axial movement of the ram rod within the first cylinder.

16. A saw blade clamp unit according to claim 14 further comprising spring means resiliently loading the pistons with respect to the cylinders within which the pistons are respectively located, the spring means biasing the pistons to a position away from the saw blade to be received between the confronting members.

17. A saw blade clamp unit according to claim 14 further comprising a guide member fixed to the main frame and an additional clamping member fixed to the arm to confront the guide member, the saw blade to be received between the confronting guide member and additional clamping member.

* * * * *